(12) United States Patent
Spencer

(10) Patent No.: US 7,064,782 B1
(45) Date of Patent: Jun. 20, 2006

(54) CAMERAS

(75) Inventor: Simon H Spencer, Chelmsford (GB)

(73) Assignee: E2V Technologies (UK) Limited, Chelmsford (GB)

( * ) Notice: Subject to any disclaimer, the term of this patent is extended or adjusted under 35 U.S.C. 154(b) by 0 days.

(21) Appl. No.: 09/786,036

(22) PCT Filed: May 20, 1999

(86) PCT No.: PCT/GB99/01594

§ 371 (c)(1),
(2), (4) Date: Jun. 4, 2001

(87) PCT Pub. No.: WO00/13421

PCT Pub. Date: Mar. 9, 2000

(30) Foreign Application Priority Data

Aug. 29, 1998 (GB) .................................... 9818949

(51) Int. Cl.
*H04N 5/235* (2006.01)
(52) U.S. Cl. .................... 348/229.1; 348/342; 348/360
(58) Field of Classification Search ................ 348/342, 348/229.1, 230.1; 359/587, 489, 888, 891
See application file for complete search history.

(56) References Cited

U.S. PATENT DOCUMENTS

| | | | | |
|---|---|---|---|---|
| 3,566,013 A | * | 2/1971 | Mocovski | .................... 348/291 |
| 3,566,017 A | * | 2/1971 | Macovski | .................... 348/286 |
| 3,681,519 A | * | 8/1972 | Larsen et al. | ................ 348/291 |
| 3,772,552 A | | 11/1973 | Kubota | |
| 4,030,118 A | * | 6/1977 | Dischert | ...................... 386/30 |
| 5,801,773 A | | 9/1998 | Ikeda | |

FOREIGN PATENT DOCUMENTS

| | | |
|---|---|---|
| GB | 2 318 012 A | 4/1998 |
| JP | 02076481 * | 8/1988 |
| JP | 02076481 * | 3/1990 |
| WO | WO 94/18801 | 8/1994 |

* cited by examiner

*Primary Examiner*—David L. Ometz
*Assistant Examiner*—Heather R. Jones
(74) *Attorney, Agent, or Firm*—Kirschstein, et al.

(57) ABSTRACT

A camera comprises a sensor such as a CCD or ICCD for receiving radiation representative of a scene, a filter such as an arrangement of parallel neutral density stripes, arranged to attenuate the radiation reaching the sensor, and decoding electronics such as comb filters which decode the encoded video output of the sensor, to produce a compressed video image, from which the pattern of the filter has been removed.

15 Claims, 3 Drawing Sheets

CAMERAS

BACKGROUND OF THE INVENTION

This invention relates to cameras.

The invention is especially concerned with the dynamic range of such cameras.

TV cameras such as TV broadcast cameras, CCTV, domestic video cameras, are provided with various servo mechanisms to enable satisfactory video signals to be produced from the imaging device, usually a CCD sensor, from a wide range of scene illuminations. The most common servo mechanism is an auto-iris, and in fact these can cope with a large dynamic range, particularly if a transparent plate with an attenuating region or regions in the iris plane, denoted a spotted iris, are employed. The tendency has however been for the dynamic range between different scene illuminations (inter-scene) to be dealt with by electronic shuttering. This means that in scenes of lower illumination, the CCD or other sensor is exposed for a full field of 20 milliseconds (ms) but with higher illumination the imager is gated so as to be exposed for perhaps only 2 microseconds (µs).

Variations of illumination within a scene (intra-scene) present more problems. In a scene in which part is brightly illuminated and part is in shadow, if the region of shadow is of interest, then, if this signal is to occupy the full dynamic range of the camera then the signals corresponding to the brightly illuminated region would greatly exceed the dynamic range of the camera, and therefore must either be clipped at peak level, thereby discarding the detail in the bright region, or compressed, thereby greatly reducing the details in the dark region.

A multi-exposure technique has been demonstrated to overcome this problem (e.g. WO-A-94/18801). CCD sensors may be gated to take two exposures of the same scene with different sensitivities e.g. 100:1 ratio. For example, alternate fields could be gated at 20 ms and 200 µs. Combining these two fields produces a compressed picture. This technique is used for example when broadcasting sports events in which the action moves between one part of the ground in full sunlight and another part in shadow.

A drawback however is that the vertical resolution and temporal resolution are reduced with this technique.

Intra-scene dynamic ranges are of course decreased if the CCD sensor is used in conjunction with an image intensifier (ICCD), since the noise level is now increased. In this case, imaging of scenes illuminated by starlight would be possible. Such an ICCD sensor has been disclosed in our patent application no. GB-A-2 318 012, in which coloured stripes were placed in front of the image intensifier, and processing electronics were used, to enable a monochrome sensor to produce a colour image.

If the double gating technique was extended to ICCDs as well as CCDs, there would be limitations about how fast the two exposures could be alternated. For example, if it was decided to expose twice within a field to reduce loss of vertical resolution, this might not be possible because of phosphor lag in the image intensifier. This is because an image intensifier has a photocathode on which an image is focussed, means such as a micro-channel plate to multiply the number of electrons generated at the photocathode, and an anode on which the electrons impinge. The anode is coated with a phosphor to generate an optical image which is then picked up by a CCD. There is a limitation as to how fast the intensity of illumination of the phosphor can change.

The problem of double exposure with intensifiers could be solved by an arrangement of two intensifiers and a beam splitter passing, say, 90% intensity to one intensifier and 10% to the other. However, the cost and bulk of the camera would then increase, and the intensifier receiving the greater intensity of illumination would require replacement at more frequent intervals than the other.

SUMMARY OF THE INVENTION

The invention provides a camera comprising a sensor for receiving radiation representative of a scene, filter means arranged to attenuate the radiation reaching different spatial regions of the sensor to different extents, and decoding means arranged to combine the contributions to the output of the sensor from the different regions, to produce an output of extended dynamic range.

The invention permits the disadvantage of reduced vertical resolution and temporal resolution to be avoided without recourse to using two image intensifiers.

The attenuating regions of the filter are preferably arranged in stripes, preferably non-parallel to the lines of the sensor, preferably inclined at around 45° to the lines. Analogue comb filters are preferably used to decode the encoded video signal produced by the sensor.

The reference to filter means attenuating to a different extent includes a total attenuation (opaque), zero attenuation (transparent), and any degree between opaque and transparent, and also includes attenuation by neutral density, by colour, or by polarisation.

The invention also provides a camera comprising a sensor for receiving radiation representative of a scene, filter means arranged to attenuate the radiation reaching different spatial regions of the sensor to different extents, and decoding means arranged to combine the contributions to the output of the sensor from the different regions, to produce an output of expanded contrast.

BRIEF DESCRIPTION OF THE DRAWINGS

Cameras constructed in accordance with the invention will now be described in detail, by way of example, with reference to the accompanying drawings, in which.

DETAILED DESCRIPTION OF THE PREFERRED EMBODIMENTS

Referring to FIGS. 1 to 5, the aim is to produce a high contrast image of a subject 1 (FIG. 1), when the subject is viewed in the presence of a bright light 2, which has the effect of reducing the contrast on the subject to a very low level. This is achieved by imaging the scene at two different sensitivities. Thus, a low sensitivity image (FIG. 3) is produced, as well as a high sensitivity image (FIG. 4), and the two are combined to produce a compressed image, which shows a full range of contrast in the subject, but which nevertheless shows detail in the light as well.

Figure 1:
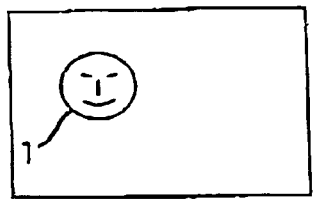
FIG. 1 represents a subject it is desired to image, in which the subject has full contrast and there are no highlights.
Figure 2:
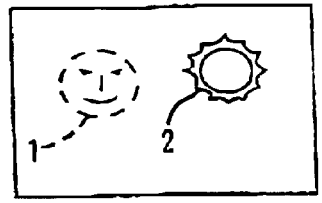
FIG. 2 represents a scene which is actually to be imaged, wherein highlights present reduce the contrast on the subject to a low level.
Figure 3:
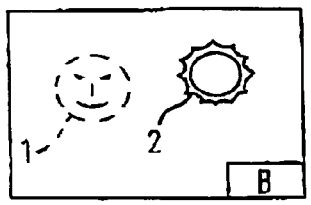
FIG. 3 represents a low sensitivity image of the scene of FIG. 2.
Figure 4:
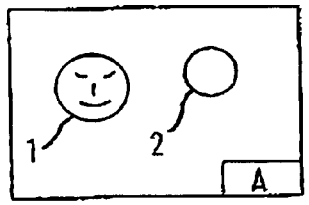
FIG. 4 represents a high sensitivity image of the scene of FIG. 2.
Figure 5:
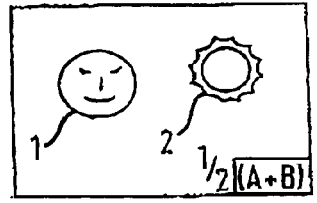
FIG. 5 represents a combination of the images of FIGS. 3 and 4.
Figure 6:
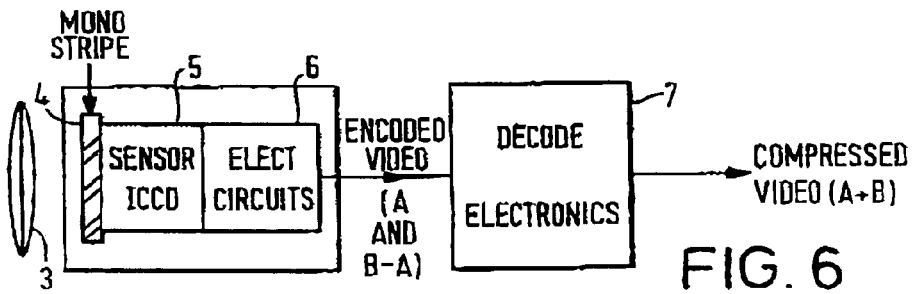
FIG. 6 is a block diagram of the camera.

In accordance with the invention, the images of different sensitivities are produced simultaneously by means of an optical filter (FIGS. 8 and 13) which attenuates the radiation reaching various spatial regions of a sensor. Thus, referring to FIG. 6, the TV camera of the invention comprises a lens 3 arranged to image a scene onto the image plane of an ICCD 5, at which the stripes of an optical filter 4 in contact with the ICCD, are in focus. Electrical circuit 6 processes the output of the ICCD, which is a video signal which simultaneously contains a low sensitivity and a high sensitivity representation of the scene being viewed. This encoded video signal is decoded in Decode Electronics 7 to produce a compressed image as in FIG. 5.

Figure 8:
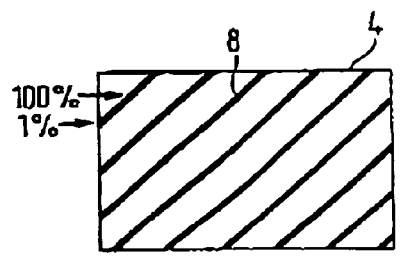
FIG. 8 represents an optical filter bearing a stripe pattern overlying the sensor of the camera.
Figure 9:
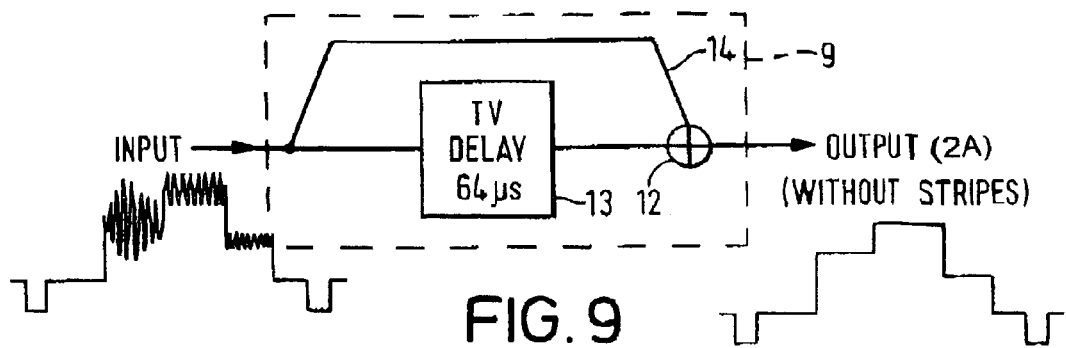
FIG. 9 shows a filter to extract the peak level of the encoded video without the influence of the stripes.
Figure 13:
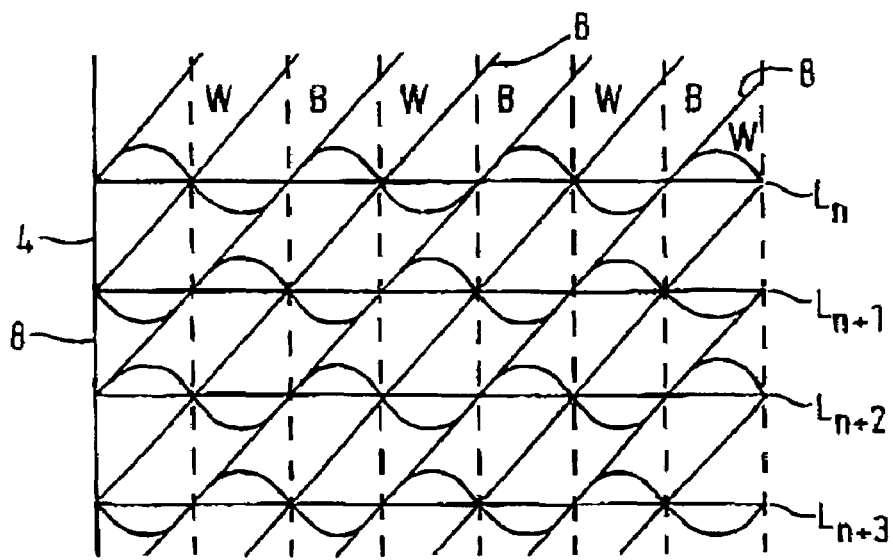
FIG. 13 shows a portion of the sensor of the camera showing a number of lines of the sensor on which are superimposed the image of the optical filter together with a representation of the brightness variation produced on the video signal by the stripe pattern, any distortion of the image intensifier being ignored.

Referring to FIGS. 8 and 13, the stripes are inclined and of such an density as to attenuate the incident radiation to 1% of incident intensity. The filter is clear between the stripes allowing 100% of incoming radiation through.

It will be appreciated that if the camera was imaged on a scene of uniform intensity, the video signal for each line would consist of an approximately sinusoidal oscillation, corresponding to the pitch of the stripes 8 (FIGS. 8 and 13) in the scan direction, with the envelope of the peaks of the sinusoids being level (i.e. the peaks having the same amplitude) corresponding to light illumination through the transparent regions between the stripes 8, and the envelope of the troughs of the sinusoids also being level and corresponding to light transmission through the stripes 8 themselves. Note that the video signal would have an approximately sinusoidal fluctuation, as represented in FIG. 13, rather than the square wave shape of the optical filtering on the line of the imager, because of filtering in the processing circuits.

Figure 7:
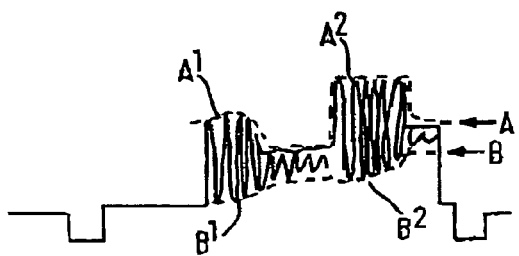
FIG. 7 represents a typical line of encoded video signal.

In the imaging of an actual scene, the envelopes of the peaks and troughs of the sinusoids for each line will not be level. The envelope of the peaks of the sinusoids (A) for any particular line will correspond to the variation of spatial intensity of the high sensitivity image of FIG. 4, while the envelope of the troughs of the sinusoids (B) will correspond to the variation of spatial intensity of the low sensitivity image of FIG. 3. Thus, referring to FIG. 2 and FIG. 7, for one particular line, the part of the envelope A denoted by $A^1$, corresponds to a high sensitivity image of the subject 1 in FIG. 2 i.e. as seen through the transparent region between the stripes, whereas the part of the envelope A denoted by $A^2$, corresponds to the image of the light as seen through the transparent regions. The envelope $A^1$ varies and contains details of the intensity of the subject, while the part of the envelope $A^2$ is level since it has been clipped and therefore does not contain any detail of the light source 2. This corresponds to the image of FIG. 4.

The part of the envelope B denoted $B^1$ corresponds to the low sensitivity view of the image 1 seen through the stripes, and is of such a low value as to barely be above the noise threshold. The part of the envelope $B^2$ is a low sensitivity image of the light 2 and corresponds to the light imaged through the stripes 8. This does contain detail. This corresponds to the image of FIG. 3.

The encoded video signal records the envelope of the peaks A and also the depth of the oscillation (B–A).

Figure 12:
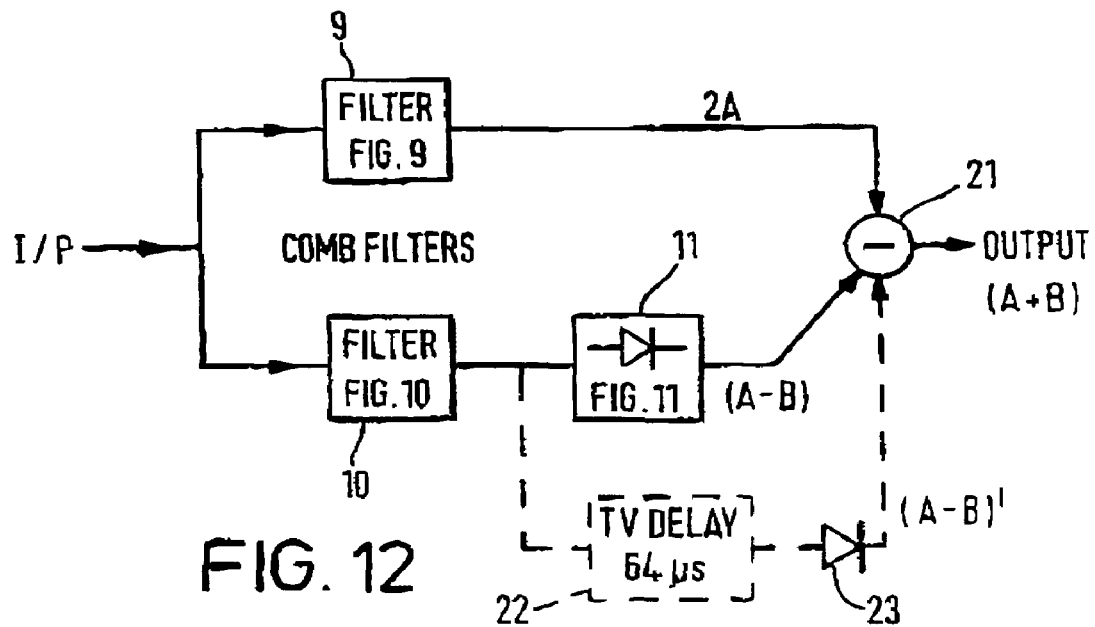
FIG. 12 is a block circuit diagram of the decode electronics to produce a compressed video signal.

The decode electronics 7 is shown in more detail in FIG. 12 and consists of analogue comb filters 9 and 10 and demodulator 11. The optical filter 4 is imaged on the CCD sensor, and FIG. 13 shows, on an enlarged scale, a portion of the filter pattern superimposed on four lines of a field $L_n$ to $F_{n+3}$ of the CCD sensor, together with a representation of the sinusoidal variation of intensity produced on the lines of the video signal by the image of the optical filter.

Referring to FIG. 13, the attenuating stripes (B for "black") alternate with non-attenuating stripes (W for "white"), but there is one more of one sort than the other. Such a situation applies in FIG. 13, although of course in reality there would be many more pairs of attenuating and non-attenuating stripes. The reason for the extra stripe is so that the intensity modulation impressed on, say, line $L_{n+1}$ will follow on continuously from that impressed on line $L_n$. In the example shown, the last section of line $L_n$ is non-attenuating, so the first section of line $L_{n+1}$ is attenuating.

The sensor operates in a progressive scan mode i.e. lines $L_n$, $L_{n+1}$, $L_{n+2}$, $L_{n+3}$ are consecutive and there is no interlacing.

The decode electronic 7 operates in the following manner. In order to produce envelope A corresponding to the brightness of the high sensitivity image but with the stripe pattern removed, a transversal filter such as an analogue comb filter 9 sums the signals corresponding to adjacent lines e.g. $L_n$, $L_{n+1}$ in analogue comb filter 9. This is achieved by adder 12 which sums the input directly received via link 14 and received via delay 13 which corresponds to one TV line (64 µs). Referring to FIG. 13, since the stripe pattern is in anti-phase on adjacent lines, the attenuation produced by this cancels, leaving only the brightness variation representative of the scene, which is reinforced since two lines are added. The output of comb filter 9 is thus output 2A.

The reason why the stripe pattern intensity is in anti-phase on successive lines is that the stripe pattern is inclined at 45° to the lines, and successive lines are spaced by half the wavelength of the stripe pattern.

Figure 10:
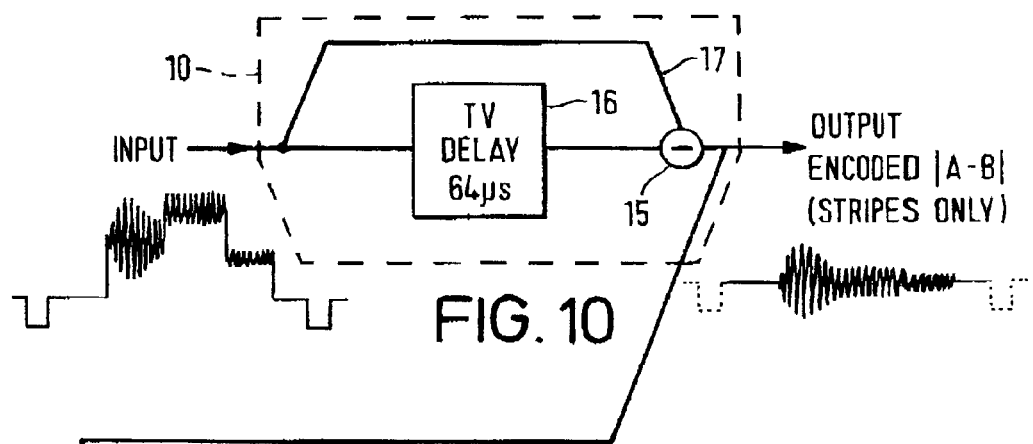
FIG. 10 shows a filter to extract a signal representative only of the stripes from the encoded video signal.

In order to produce an output representing the difference between the modulation envelopes A and B, i.e. |A−B|, a transversal filter such as the comb filter in FIG. 10 subtracts adjacent lines e.g. $L_{n+3}$, $L_{n+2}$ to remove the overall brightness level of the scene whilst reinforcing the sinusoidal form of the stripe intensity modulation. Adjacent lines are subtracted at subtractor 15 by means of direct link 17 and delay 16 corresponding to one TV line (64 µs). The output of this filter is the modulation corresponding to the depth of modulation of the sinusoids of the stripe pattern i.e. |A−B|. This signal is demodulated in diode detector 11 consisting of diode 18 and RC smoothing circuit 19, 20.

These two signals are combined at subtractor 21 (FIG. 12). Since the output of the comb filter 9 is double the intensity of the scene, the resulting output from the decode electronic is the summation of the two envelopes A and B i.e. the required compressed image of FIG. 5.

The sensitivity loss of having only half the sensor area fully sensitive is partly restored by the comb filtering benefits of noise i.e. 3 db for single comb filter, 4.8 db for a double filter.

Figure 11:
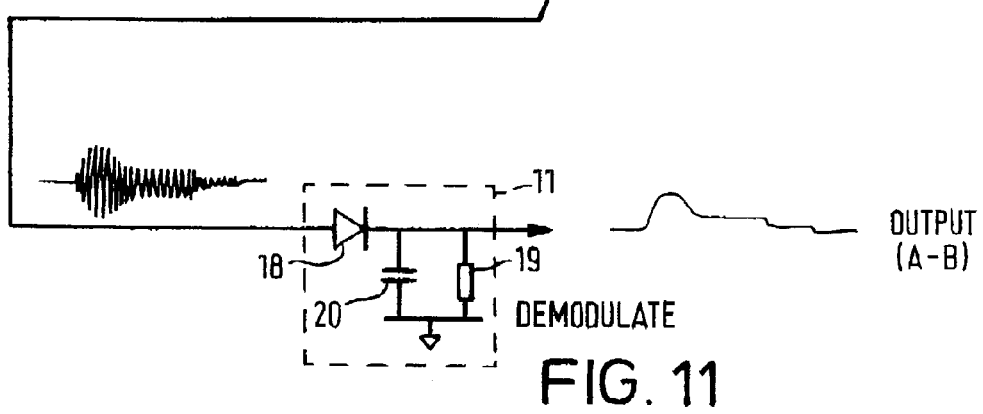
FIG. 11 shows a circuit for demodulating the output representative of the stripe pattern.

Improved resolution can be obtained by the use of a third delay line 22 (delay 64 μs), shown dotted, the output of which is demodulated by a demodulator similar to that shown in FIG. 11 but shown symbolically by diode 23. As an example, consider the arrival of line $L_{n+2}$ at the input of comb filter 10. At the subtractor 15, line $L_{n+1}$ is subtracted from it. The amplitude of the stripe pattern modulation is increased. At the diode 11, only positive half cycles are passed i.e. the first, the third etc. At the same time, diode 23 is passing the positive cycles of the difference between lines $L_{n+1}$ and $L_n$, this time only the second, fourth etc. half cycles. Thus, signal A–B is represented with increased resolution by combining signal A–B from diode detector 11 with signal (A–B)' from diode detector 23, so that there is signal present on each half cycle. Whereas the resolution of the low sensitivity signal A–B has a bandwidth of approximately 1.8 MHz, (the stripe pattern having a resolution of 3.5 MHz), addition of the delayed stripe pattern (A–B)' gives a resolution of 3.5 MHz.

With a typical CCD array of 600×600 pixels, the filter may consist of 300 neutral density stripes alternating with transparent regions of the same width as the stripes, subject to there being one more or less neutral density than transparent stripe across the length of each line. The stripes are arranged at the image plane of the ICCD in such a way that when their shadow is cast on the CCD array, the stripes are orientated at 45° to the lines of the CCD array $L_n$ etc. It is critical that the lines are aligned with each other for the purposes of the comb filters, but manufacturing tolerances mean that the stripes will not be arranged at exactly 45° to the lines of the CCD, manufacturing tolerances might also dictate that there are slightly more or less than 300 stripes crossing the top or sides of the CCD array, and there may also be slight uncertainties in the crystal frequency of the camera which is used to generate the line frequencies etc. It is for this reason that, during manufacture, the delay lines 13, 16 and 22 are trimmed in order to get an exact one line delay of 64 μs between adjacent lines, and this can be done using a oscilloscope on the output 21.

It will be appreciated that other inclinations of the stripes to the ICCD lines are possible, so long as they are not vertical, since in this case there would not be a phase difference between one line and the next for the stripe modulation pattern, and its effects could not be removed. It will merely be necessary to trim the delay lines 13, 16 and 22 so that the modulation patterns of consecutive lines is in anti-phase to each other. Also, it is not necessary for the stripes to alternate with equal widths of transparent areas. Other mark/space ratios are possible. Further, the stripe filter need not be positioned at the focal plane of the ICCD, it may be positioned anywhere in the path of radiation onto the CCD sensor e.g. using relay lenses, so long as it is in focus on the image plane and may in fact be formed directly on the CCD sensor. Further, it is not necessary for there to be the same number of stripes and transparent areas as there are lines of the sensor, there could be more or less stripes and alternating transparent regions than there are lines of the sensor.

In the embodiment described, the stripes only allow through 1% of light intensity. Of course, different densities are possible, and even the transparent region could be replaced by an attenuating region of different properties. In fact, opaque stripes i.e. 100% attenuation e.g. of aluminium, could be employed. Even though these stripes allow no light through at all, nevertheless there is a contribution to the output of the sensor, namely, due to noise $$\left(\frac{1}{f}\right)$$

particularly generated in the image intensifier but also in the CCD. This noise signal provides a black level reference which can be subtracted from the contribution to the output from the transparent regions, to compensate for temperature and $$\left(\frac{1}{f}\right)$$

noise.

Also, it is not necessary for the stripes to be of neutral density. They could be one particular colour e.g. blue, which would attenuate incandescent lights which radiate a large amount of red light.

Further, the stripes could be polarizing, arranged to attenuate light of a particular polarisation. This could be a particular advantage to reducing reflections e.g. of light from a wet road surface.

Further, more than one set of stripes could be provided. For example, a second set of different attenuating properties could be provided on the optical filter at a different angle to the lines of the sensor. Indeed, further sets of lines could be provided with different attenuating properties. In particular, a set of opaque stripes could be arranged with a set of 1% attenuating stripes. With one set of stripes, they could be inclined to the vertical of he raster as seen in FIG. 13 at 22°, a second set could be arranged at −22° to the vertical, and a third set could be inclined at −45° to the vertical.

For example, a combination of stripes of neutral density, coloured (e.g. dark blue) and opaque could be used. The benefit of the invention (picture compression and extended dynamic range) would be both spectrally and scene responsive.

Further, one or more sets of stripes, provided to extend the dynamic range of the sensor in accordance with the invention, could be combined with coloured stripes as described in our earlier patent application no. 2 318 012 to produce a colour or pseudo colour output from a monochrome sensor. Indeed, two sets of coloured stripes could be provided; a first set of one attenuation to produce the colour output, and a second set of greater attenuation (the same colour but greater density) to extend the dynamic range. These could be set at different angles to the first set.

Variations may be made on the encoding (stripe patterns) and decoding to produce the signals A, A–B, (A–B)'. There are benefits to be gained by using more sophisticated filtering in the decode electronics block 7. For example, double delay filters or triple delay filters may be used.

The regular pitch of the stripes gives the option of demodulation of the encoded video by the use of a circuit tuned to the frequency of the stripes.

In the described embodiment using ICCD, the image intensifier used produces a distortion of only ½% at the CCD sensor. However, there are other image intensifiers which produce a much greater geometric distortion e.g. 10%, in which case the stripe pattern of FIG. 13 would be distorted by the image intensifier. Another alternative which would be useful in this case, would be for the decode electronics to use a memory map relying on stored signals to relate the pixels of the CCD sensor to the (distorted) stripe pattern falling on the CCD sensor, for example as described in our prior patent application no. 2 318 012. Indeed, if a memory map was used, the attenuating regions of the filter could be in any arrangement desired, not necessarily a stripe pattern.

As another alternative, it will be possible to modify the delay network to accommodate geometry distortion by providing a voltage variable delay having as its input a signal related to the geometric distortion of the ICCD. Non-linear tuned circuits e.g. level and/or frequency adaptive could be used e.g. to remove a low level stripe pattern.

The stripes may be placed in contact with the ICCD or a relay lens may be used to project their image onto the image plane of the ICCD.

In the embodiments referred to above, the imager is an ICCD. The ICCD sensor comprises as is well known a CCD array coupled e.g. by optical fibres to the phosphors on the output surface of an image intensifier. The striped pattern may be cemented to the front surface of the intensifier, possibly using a fibre optic coupling. However, the invention is applicable also to CCD sensors which are not intensified. Further the invention is applicable to monochrome or colour sensors. However, in fact a wide variety of imagers may be used such as a CMOS imager, a tube such as a vidicon or orthicon, sensors active in the UV region may be used, e.g. visible near infra-red or far infra-red. The invention has been described in relative to progressive scanning, but is also applicable to interlace scan.

Furthermore the sensor may be a non-imaging sensor e.g. for an infra-red intruder alarm. Or the invention is applicable to optically-coupled thermal cameras in which the thermal signal is used to vary the intensity of light on a sensor e.g. by varying the polarising angle in a transducer.

The cameras described above are used for high contrast scenes where compression is desirable. Some scenes, of lesser contrast, will benefit from the invention as well. Very low contrast scenes, such as "misty" viewing conditions, will not show any benefit from the cameras. A small change to the cameras described above can accommodate very low contrast scenes. When the subtractor 15 in FIG. 12 is changed to be positive i.e. an adder, the camera becomes an expander of contrast. Some imaging sensors have a non-linear compression response (e.g. specially fabricated CCD devices). These special devices could be converted to a linear response by using the expansion improvement. In fact, the cameras described above could be provided with a switch to enable the contrast expander option to be selected as desired.

What is claimed is:

1. A camera, comprising: a sensor for receiving radiation representative of a scene; filter means for attenuating the radiation reaching different spatial regions of the sensor to different extents; and decoding means for combining contributions to an output of the sensor from the different spatial regions, to produce a camera output representative of lines of an image of the scene of extended dynamic range, the filter means comprising stripes orientated so that lines of the stripes are inclined to the lines of the image, the decoding means being operative for removing a pattern of the stripes from the output of the sensor.

2. The camera as claimed in claim 1, in which the stripes are inclined at an angle within a range of ±45° to ±80° to the lines of the image.

3. The camera as claimed in claim 2, in which the stripes are at approximately ±45° to the lines of the image.

4. The camera as claimed in claim 1, in which the stripes are neutral density stripes.

5. The camera as claimed in claim 1, in which the stripes are opaque.

6. The camera as claimed in claim 1, in which the stripes are colored.

7. The camera as claimed in claim 1, in which regions between the stripes are polarizing.

8. The camera as claimed in claim 1, in which regions between the stripes are transparent.

9. The camera as claimed in claim 1, in which there is a plurality of sets of stripes, each having different attenuating properties and being inclined at different angles to the lines of the image.

10. The camera as claimed in claim 1, in which the decoding means is operative for combining successive lines of the image to reinforce the image and cancel the contributions to an intensity of the stripes.

11. The camera as claimed in claim 10, in which the decoding means comprises at least one comb filter.

12. The camera as claimed in claim 1, in which the decoding means is operative for combining successive lines of the image to cancel the contributions to an intensity of the image and reinforce an intensity of the stripes.

13. The camera as claimed in claim 1, in which the sensor is a charge coupled device.

14. The camera as claimed in claim 1, in which the sensor includes an image intensifier.

15. A camera, comprising: a sensor for receiving radiation representative of a scene; filter means for attenuating the radiation reaching different spatial regions of the sensor to different extents; and decoding means for combining contributions to an output of the sensor from the different spatial regions, to produce a camera output representative of lines of an image of the scene of expanded contrast, the filter means comprising stripes orientated so that lines of the stripes are inclined to the lines of the image, the decoding means being operative for removing a pattern of the stripes from the output of the sensor.

* * * * *